United States Patent [19]

Whipkey et al.

[11] Patent Number: 5,603,134
[45] Date of Patent: Feb. 18, 1997

[54] PORTABLE BRIDGE SYSTEM

[75] Inventors: Craig R. Whipkey, S. Connellsville; Peter L. Bloomer, Chalk Hill; Kirk Wright, Masontown, all of Pa.; Michael P. Wolcott, Bruceton Mills, W. Va.

[73] Assignee: Coastal Lumber Company, Uniontown, Pa.

[21] Appl. No.: 495,167

[22] Filed: Jun. 27, 1995

[51] Int. Cl.6 .............................. E01D 15/12; E01D 19/12
[52] U.S. Cl. ................... 14/2.4; 14/73; 52/223.7; 52/223.11; 52/586.1; 52/592.1; 182/222; 403/337; 404/51; 404/56
[58] Field of Search ..................... 14/2.4, 3, 4, 6, 14/14, 73, 73.1, 74.5, 77.1; 52/422, 434, 428, 429, 430, 433, 435, 437, 223.7, 223.11, 586.1, 586.2, 588.1, 584.1, 592.1, 589.1, 590.1, 591.1, 726.1, 726.2, 578–580; 403/335, 337; 404/53, 55, 56, 73

[56] References Cited

U.S. PATENT DOCUMENTS

| | | | |
|---|---|---|---|
| 2,021,922 | 11/1935 | Peck | 52/592.1 X |
| 3,606,418 | 9/1971 | Buker et al. | 52/726.2 X |
| 4,499,967 | 2/1985 | Anderson | 182/222 |
| 4,965,903 | 10/1990 | Bisch | 14/2.4 |
| 4,984,654 | 1/1991 | Anderson | 182/222 X |
| 5,007,222 | 4/1991 | Raymond | 52/586.1 |
| 5,014,476 | 5/1991 | Leslie et al. | 52/586.1 X |
| 5,097,558 | 3/1992 | Accorsi et al. | 14/2.4 X |

*Primary Examiner*—James A. Lisehora
*Attorney, Agent, or Firm*—Jacobson, Price, Holman & Stern, PLLC

[57] ABSTRACT

A portable bridge system formed from at least a pair of substantially rectangular bridge platforms positioned in side-by-side relationship including end locking plates for locking the platforms together at the end regions thereof. The invention further includes shear plates integral with, and spaced along, a side edge of the bridge platform for engagement with an adjacent bridge platform to resist transverse shear forces between adjacent bridge platforms.

11 Claims, 5 Drawing Sheets

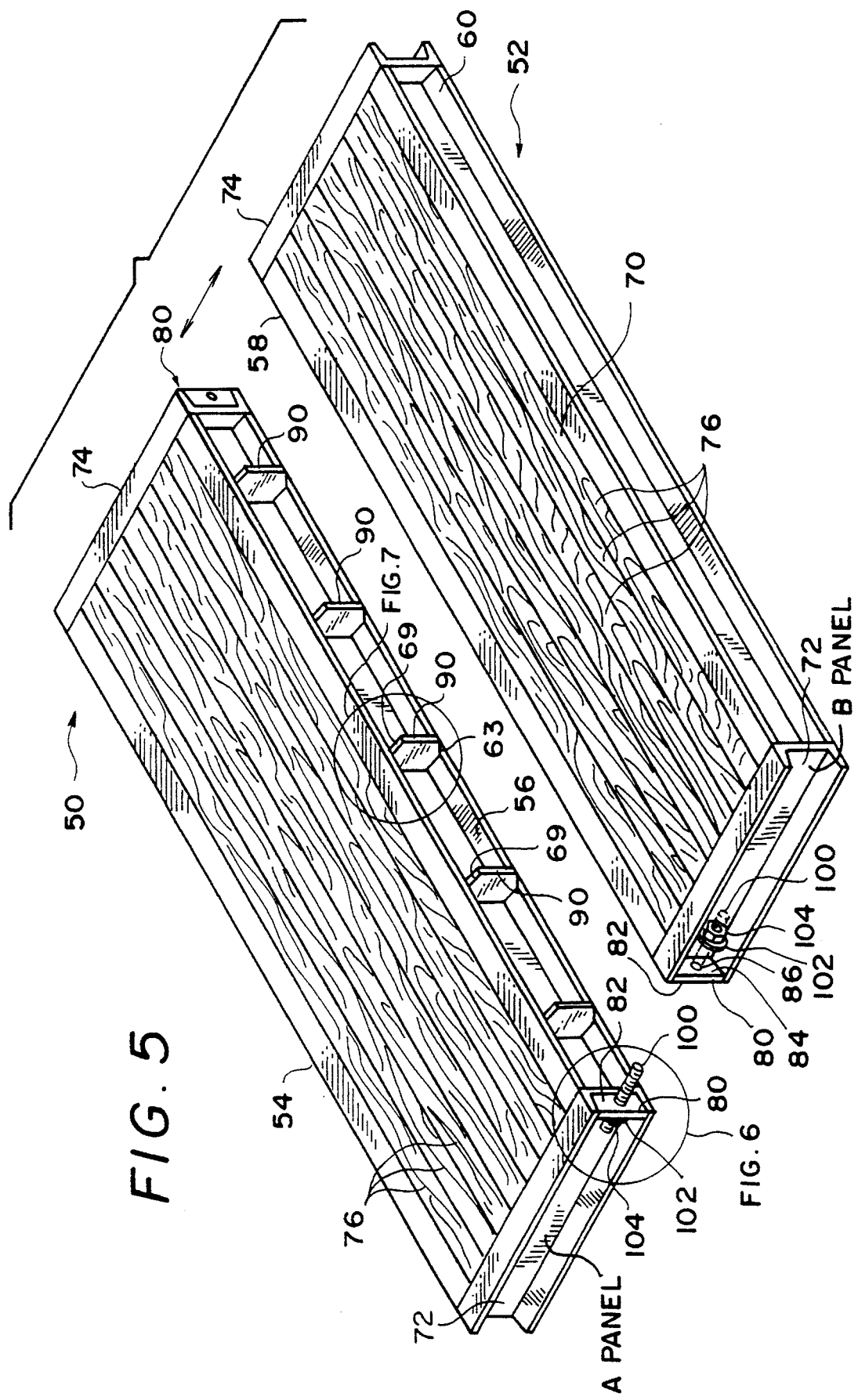

PORTABLE BRIDGE SYSTEM

BACKGROUND OF THE INVENTION

1. Field of the Invention

This invention relates to a portable bridge system that can be assembled on site, particularly in remote locations such as timbering locations. The bridge is formed from at least a pair of substantially rectangular bridge platforms or panels that are positioned in side-by-side relationship to form the bridge span. The invention includes end locking plates integral with, and mounted on, at least two corners of the bridge platform to lock the platforms together at opposite ends of each platform. An end locking plate is aligned with, and is bolted to, an adjacent end locking plate of the adjacent bridge platform. At least one of the pair of adjacent bridge platforms further includes a plurality of shear plates, or keys, spaced apart along the side length of the bridge platform and fixed thereto. These shear plates mate with the corresponding side length of the adjacent bridge platform and provide resistance against relative shear forces, or movement, between the platforms in a transverse, i.e., a downward direction.

2. Description of Related Art

Portable bridge systems formed from separate bridge platforms, or panels, are known in the art. One such bridge system, as further described hereinbelow, has been devised by West Virginia University. Such bridge systems are formed from a plurality of bridge platforms that are rectangularly shaped and include side channels and, in some cases, end plate channels. The bridge platform surface itself is formed from a plurality of laminates of lumber, typically each lumber board being 6 to 12 inches thick and 1½ inches wide. The wooden boards are sandwiched between the steel side channel members and compressed between the side channel members by tensioning rods or stressing bars that extend transversely across and through the bridge platform, from side channel to side channel, and through each of the wooden boards. In forming a bridge from these platforms, a pair of such platforms are positioned in side-by-side relationship and are connected to each other, on site, by inserting a plurality of long connecting bolts, or tensioning rods, each having a length greater than the overall side-to-side width of the two bridge platforms, through holes or openings extending through the side channels and wooden boards. These elongated bolts are then tensioned on the job site to retain the bridge platforms to each other. In addition, and during the connecting bolt insertion process prior to tensioning, a plurality of wooden shear blocks, having holes or openings therethrough, are positioned between the side channels of the platforms during the assembly. The connecting bolts are threaded through each wooden shear block. These wooden shear blocks assist in preventing transverse movement or sliding of one bridge panel with respect to the adjacent bridge panel.

The overall portable bridge system as described above has a number of disadvantages. For example, installation of the bridge becomes quite labor intensive at the job site. The adjacent bridge platforms or panels must be carefully aligned with each other so that the elongated and cumbersome connecting bolt may be inserted through the connecting hole openings, first through one platform, then through the wooden shear blocks, and then through the next platform. Because the width of each platform may be approximately six feet (excluding the wooden shear blocks), thus making the overall width of the pair of platforms in excess of twelve feet, the alignment of the platforms and shear blocks, and the insertion of the connecting bolts, are extremely difficult. As can be appreciated, depending upon the particular terrain over which the bridge is to be formed, it may be difficult to precisely align the openings of each bridge platform with the adjacent bridge platform so as to be able to insert the elongated connector bolt through the rather substantial width of the two bridge platforms. In addition, insertion of the wooden shear blocks between the side channels of adjacent bridge platforms is time consuming and logistically difficult, particularly where the bridge is to be assembled at great heights, or over water, where access to the underside of the bridge platforms is difficult.

SUMMARY OF THE INVENTION

The present invention solves many of the problems of the prior art by providing a quicker, safer, and more effective system for interconnecting adjacent bridge platforms to form a bridge span. Fixedly secured to at least two corners of a bridge platform, along the same side of the bridge platform, are substantially flat end locking plates having holes or openings extending through the plate faces. These locking plates are interconnected to similarly disposed locking plates on the adjacent bridge platform by a relatively short bolt which serves to lock the bridge platforms at opposite ends thereof, thus eliminating the necessity for elongated connector bolts inserted at periodic positions between the ends of the adjacent platforms and extending across the entire overall width of the two adjacent platforms. The use of bolted end locking plates at the ends or corners of the platforms provides a quick, strong, and efficient interconnection at the opposite ends of the bridge span thus avoiding difficulties in interconnecting the bridge span in the more central regions of the span.

The present invention also eliminates the necessity to interfit wooden shear blocks between the bridge panels or platforms during the on-site assembly. The present invention provides for a plurality of shear plates, i.e., shear keys, welded or otherwise fixedly connected and spaced along the length of a side channel of at least one of the platforms. Each shear plate has an external profile complementary to the side channel of the adjacent platform for providing a secure interfit therewithin. Thus, the one bridge platform that includes the integral shear plates will interfit witch an adjacent bridge platform that receives the shear plates thus minimizing the on site assembly time and avoiding the difficult assembly problems of the wooden blocks. The shear plates, or keys, prevent one bridge platform from moving transversely, i.e., in a direction perpendicularly downward, with respect to the adjacent bridge platform.

Thus, it is an object of the present invention to provide an efficient, safe, and quick assembly of portable bridge platforms to form a portable bridge span. It is further an object of the present invention to provide a locking mechanism for locking adjacent bridge platforms to each other at the job site through the use of end locking plates at the corners of the bridge panels without requiring exact mating of adjacent bridge panels and without the use of elongated connector rods that span the overall width of two adjacent panels. Still further, it is an object of the present invention to provide steel shear plates between the platforms that are formed integral with at least one platform for mating engagement with the adjacent platform without requiring any assembly of separate components, or wooden shear blocks at the job site. These and other objects of the present invention will be apparent when reference is made to the accompanying

BRIEF DESCRIPTION OF THE DRAWINGS

FIG. 3 is a cross-section taken along section line 3—3 of

FIG. 5 is an exploded perspective view of a bridge span formed a pair of bridge platforms.

DESCRIPTION OF THE PREFERRED EMBODIMENT

Figure 1:
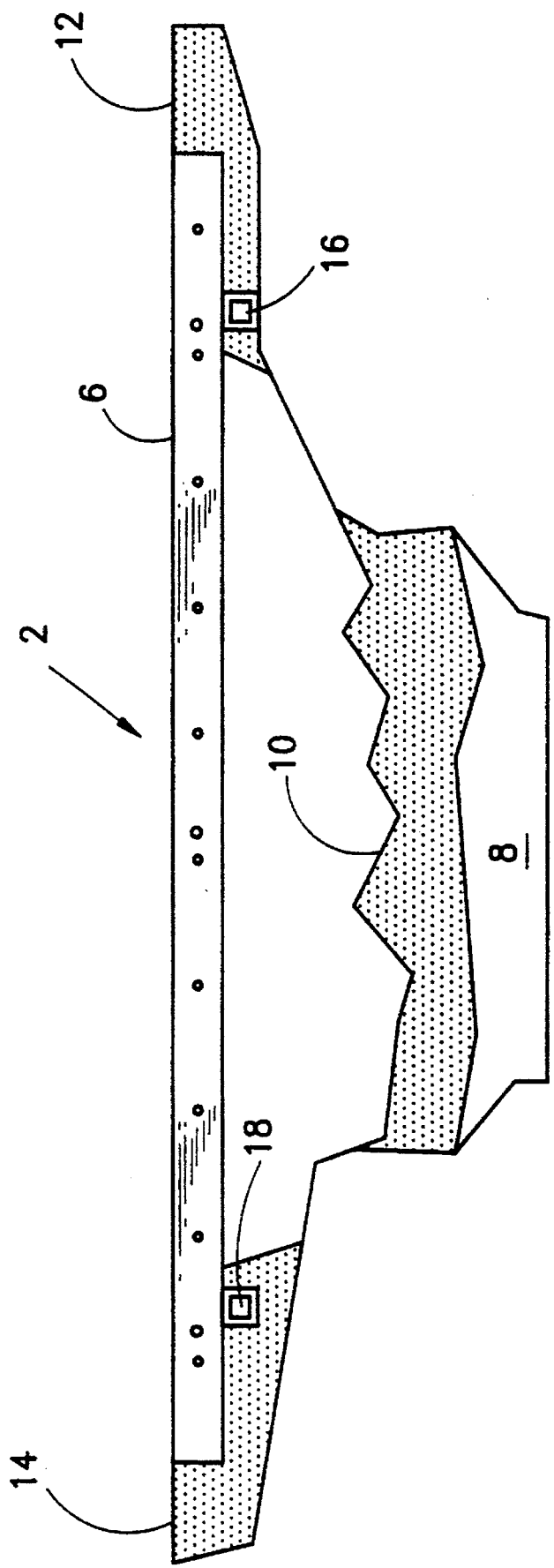
FIG. 1 is a side view of a portable bridge of the prior art assembled over a stream bed.

A portable bridge system of the type known in the prior art is illustrated in FIGS. 1–4. Bridge span 2 is formed from a pair of bridge platforms or panels 4,6 that are interconnected to form the bridge span 2. The portable bridge span is assembled on site over, for example, a stream outflow 8 that underlies a preexisting rock ford 10. In this particular example, the bridge platforms are supported by rock fills 12,14 disposed on opposite sides of the stream with cant members 16,18, to assist in supporting the bridge panels. Alternatively, as is known in the art, the bridge panels can be supported over an abutment that supports the underside of the bridge platforms and abuts against the banks of the stream. The bridge panels 4,6 may be of 40 feet length and there is approximately a 5 foot overhang on each side of the bank to support the bridge panels.

Figure 2:
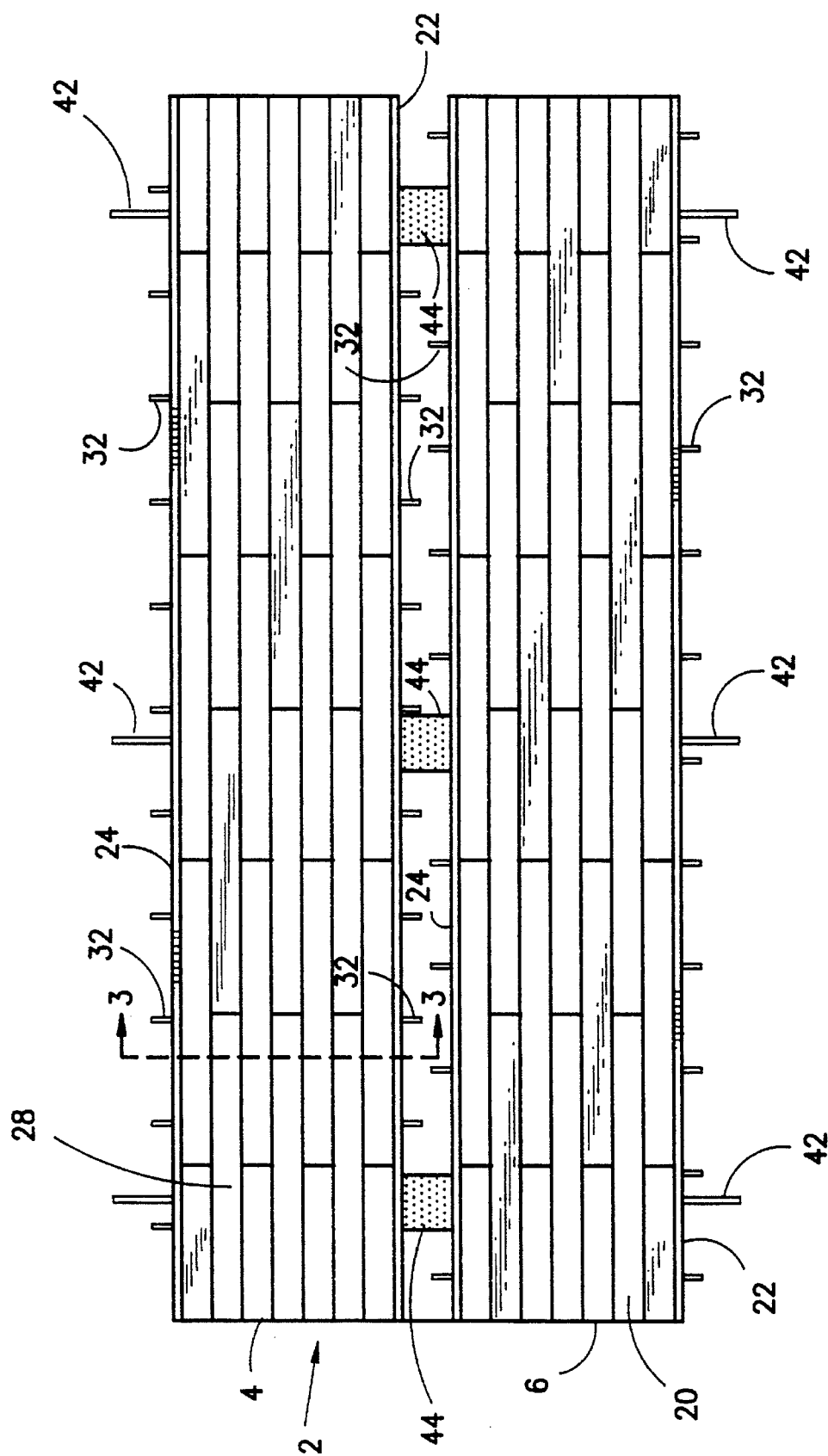
FIG. 2 is a plan view of a prior art bridge span formed from a pair of prior art bridge panels.
Figure 3:
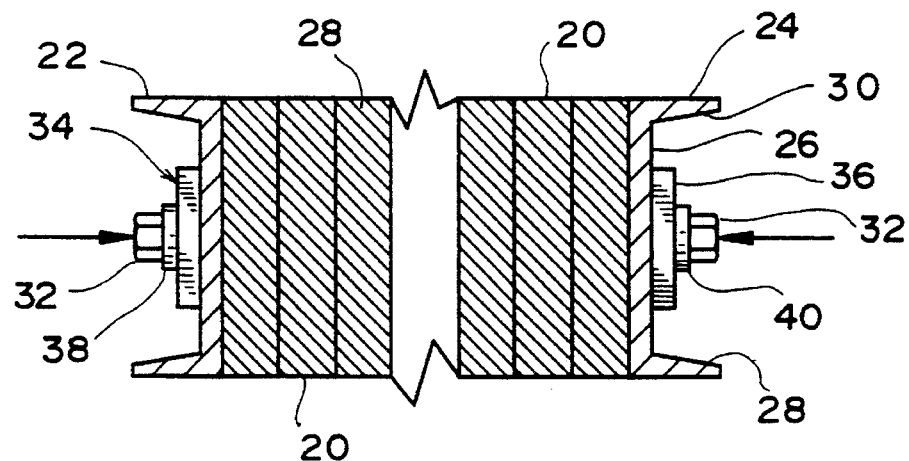
Figure 4:
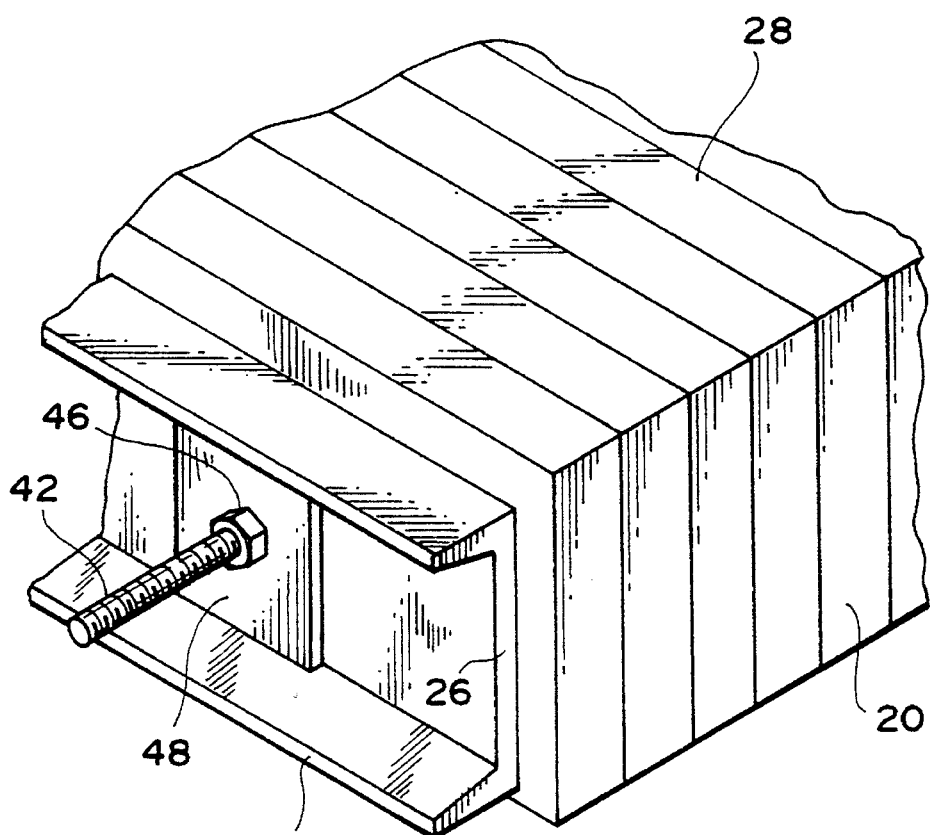
FIG. 4 is a perspective view of a portion of a prior art bridge panel.

Each bridge panel 4,6 is formed from a plurality of laminates of lumber, i.e., wooden boards 20 (as best shown in FIGS. 3 and 4) in abutting side-by-side relationship. The boards are typically 6–12 inches thick (i.e., from the top 28 of the platform to the underside of the platform) and 1½ inches wide. The wooden boards 20 are sandwiched between a pair of steel side channel members 22,24 having a web 26 substantially perpendicular to the top surface 28 of the platform, which web merges with angled surfaces 28,30 which are angled in an outward direction. (As shown in FIG. 4, the surfaces that merge with web 26 may be perpendicular to the web.) The wooden boards 20 are placed under substantial interlaminar pressure by the imposition of tensioning rods or stressing bars 32 that extend entirely through openings in the platforms 4,6, including both side channel members and each of the wooden beams. The tensioning rods include an anchor plate 34 on opposed sides of each side channel 22,24 with a nut 38,40 which applies substantial tension to the bar 32. In FIG. 2, each tensioning rod 32 is shown extending in an exaggerated manner from each side channel member. These extensions are preferably trimmed off after tensioning, as shown in FIG. 3. Although not shown, the prior art platforms optionally included steel end plate channels affixed at opposite ends of the platform. In the above prior art systems, these pre-assembled platforms were brought to the job site and then assembled to form a bridge in a manner to be described. (As will be discussed below, the present invention similarly provides for pre-stressed platforms to be brought to the job site for assembly.)

Assembly of the prior art bridge platforms to form a bridge span requires the use of a long connecting bolt, or tensioning rod, 42 of a length greater than twice the width of the bridge platforms. At the job site, the bridge platforms 4,6 are placed adjacent to each other and the connecting bolt 42 is inserted through openings in the bridge platforms, through openings in wooden shear blocks 44, and through openings in the adjacent bridge platform. The shear blocks 44 are formed of wood and interfit between the side channel members in an attempt to prevent shear or transverse movement of one panel 4 with respect to the adjacent panel 6. (The wooden shear blocks 44 are depicted in somewhat exaggerated form; it should be appreciated that they may be narrower in actual practice.) As shown in FIG. 4, each connecting bolt 42 includes a nut 46 and an anchor plate 48. After the connecting bolt is inserted first through a hole or opening in one bridge platform 6, through an opening in a wooden shear block 44, through the adjacent bridge panel 4, including the side channel member 24, the connecting bolt or tensioning rod is stressed in a manner similar to the stressing of each separate bridge platform. As should be apparent, it is extremely difficult to properly align the openings in adjacent bridge platforms to receive the lengthy connecting bolt. Moreover, it is sometimes difficult to assemble the bridge span by inserting the connecting rods through the platforms and the wooden blocks on the job site.

Figure 7:
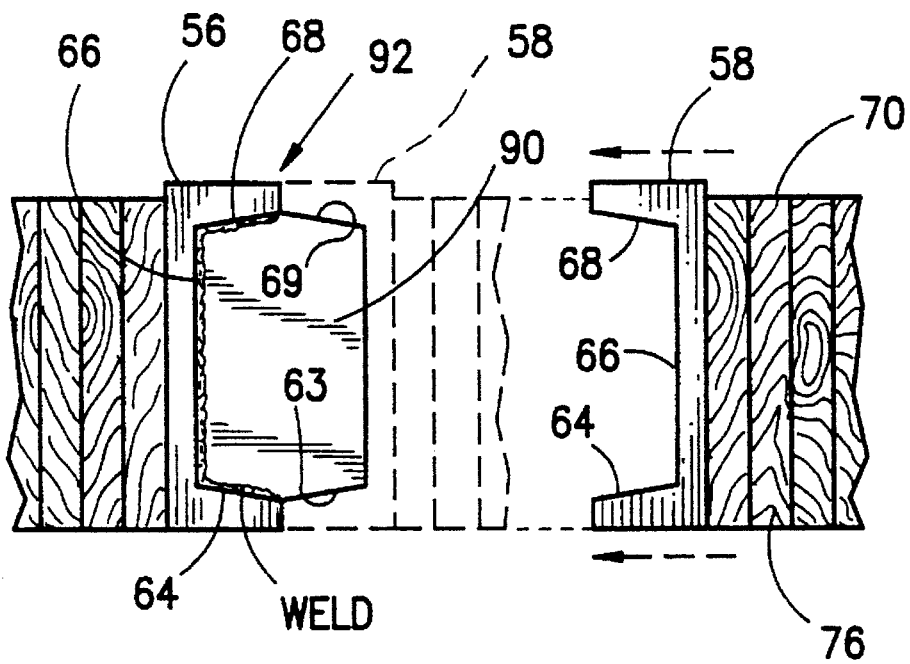
FIG. 7 is a view of the shear plate or key.
Figure 6:
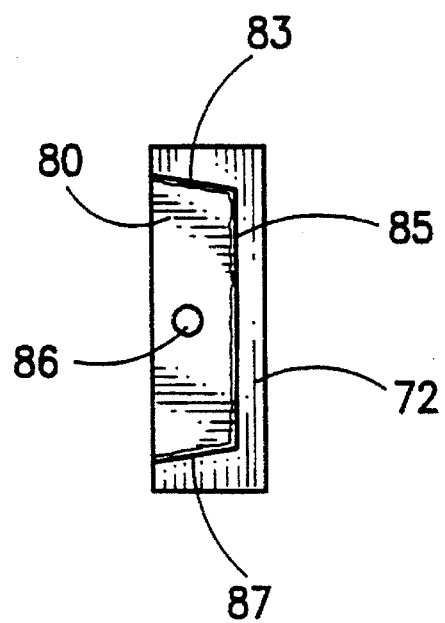
FIG. 6 is a side view of an end locking plate of FIG. 5.

The improvement of the present invention is depicted in FIGS. 5–7 A pair of bridge platforms 50 52 are interconnected in side-by-side relationship to form a bridge span in a manner to be described. Each bridge panel includes side channel members 54,56 and 58,60. The side channel members are substantially the same size and shape as the side channel members discussed above with respect to the prior art. That is, the side channel members are formed of steel and include three surfaces 64,66,68 including a first surface 66 lying substantially perpendicular to the bridge platform top surface 70 and forming a web between the second and third surfaces 64,68, each of which are preferably angled outwardly from the first surface 66. This angled departure is not critical and, indeed, the surfaces 64,68 of the side channel members may be at right angles to the web surface 66. At opposed ends of the bridge platform are end plate channel members 72,74 shaped similarly to the side channel members and extending widthwise along the entire width of the bridge platform. The end plate channel members 72,74 are secured to the side channels by welding. Thus, the two side channel members 54,56 and the two end plate channel members 72,74 form a rectangular bridge platform with the end plate channel members substantially perpendicular to the side channel members.

Between the side channel members 54,56 are a plurality of laminates of lumber, i.e., wooden boards 76 of the same size and shape as described above with respect to the prior art. The side channel members 54,56 sandwich the wooden boards 76 through the use of tensioning rods, bolts, and anchor plates in same manner as described above in the prior art (elements 32, 34 and 38). The plurality of tensioning bolts is not depicted in FIG. 5. Thus, each bridge platform 50,52 is pre-tensioned and brought to the job site.

The present invention dispenses with the use of any connecting bolts 42 and associated components and assembly deficiencies. Disposed at opposite ends of each bridge platform 50,52 are a pair of substantially flat end locking plates 80, each end locking plate having opposed parallel plate faces 82,84 with an opening 86, preferably circular (although oval, or racetrack shapes, etc. may be provided), extending through the plate faces 82,84. Although FIG. 5 shows only the locking plates 80 on one end of the platforms 50,52, it should be understood that such locking plates are also affixed to each of the end channel members 74 at the opposite end of each platform. The locking plates 80 are thus fixed at two end corners of a bridge platform 50 at one side of the bridge platform, i.e., adjacent side channel member 56, with the plate faces 82,84 lying in a plane substantially parallel to the orientation of the side channel member 56, and substantially perpendicular to the top 70 of the platform.

The locking plates 80 are preferably of 1 inch thick steel plate and slightly trapezoidal in perimeter configuration. The three sides 83,85,87 of the trapezoidal-shaped plate are mated with and are welded to the end plate channel members 72,74 at the ends of the end plate channel member where it intersects the side channel member. The trapezoidal shape is necessary to mate with the specific configuration of the profile of the end plate channel member 72,74. However, if the end plate channel member has a different profile, such as a rectangular profile, then the end locking plate should be of the same complementary rectangular, or other profile.

During on site installation, each end plate 80 is aligned with its adjacent end plate 80 on the adjacent panel. In addition, for manufacturing uniformity, end locking plate members 80 could be welded at each of the four corners of each platform. This would be required if more than two platforms are required to be interconnected to form a bridge span.

The bridge platforms 50,52 further include a plurality of shear plates, or shear keys, 90 which are affixed every few feet (such as every five feet for a forty foot platform length) along one side channel member 56 of a bridge platform 50. The shear plates 90 are preferably one inch steel plate somewhat hexagonally shaped or otherwise shaped to be complementary to the inner perimeter sides 64,66,68 of the side channel members. As shown in FIG. 7, the three surfaces of the shear plate 90 are welded to the surfaces 64,66,68 of side channel member 56. Each shear plate 90 has an outer perimeter substantially complementary to the profile of the side channel member 58 of platform 52 and this outer perimeter defines one or more shear plate engagement surfaces for engaging one or more of the inner surfaces 64,66,68 of the complementary side channel member 58. When the two bridge platforms 50,52 are assembled on site, i.e., by side-by-side orientation, the outer perimeter of the shear plate 90 engages the inner surfaces of the complementary side channel member 58 and is in contact engagement therewith. It is important that at least the top-most shear plate engagement surface 69 engages the complementary surface 68 to resist downward movement of platform 52. Similarly, when platform 54 moves downwardly (such as by vehicle weight over the bridge platform), the shear plate engagement surface 63 must engage with, and be resisted by, complementary surface 64. Preferably, the dimensions of each shear plate 90 and opposed side channel member 58 are such that the side channel members 56,58 closely abut each other, at 92, when the bridge platforms are brought together and secured to each other, in a manner to be described. The shear plates, or shear keys, 90 resist shear or transverse forces, i.e., movement of one bridge platform with respect to the adjacent bridge platform in a downward direction.

The bridge platforms 50,52 are coupled to each other by the use of a locking bolt 100 that extends through the mated end plates 80. A bolt 100 sized for insertion through the openings 86 of the substantially aligned locking plates 80 is inserted and, on opposite sides of the bolt are a washer 102 and nut 104 arrangement which are tightened against the locking plate faces to provide a secure interconnection. The nuts 104 are threadingly engaged to the bolt 100. Alternatively, the bolt 100 could have an integral bolt head and washer, affixed, e.g., by welding, at one end of the bolt (not shown).

As shown in FIG. 5, only bridge platform 50 includes the shear plates 90 affixed to one side channel member 56. The mating side channel member 58 does not include any shear plate, although shear plates could be provided on platform 52 so long as they are offset from the shear plates of the platform 50. This would increase the resistance to shear. Similarly, shear plates could be welded on the opposite side channel member 60 of the platform 52 for engagement with yet another bridge platform to form a wider bridge span. Indeed, each bridge platform could be uniformly made with shear plates affixed to each of the side channel members, offset slightly from each other to avoid "collisions" when two platforms are mated.

We claim:

1. In a portable bridge system formed from at least a pair of substantially rectangular bridge platforms, each of said bridge platforms defining substantially parallel sides and substantially parallel ends, said bridge platforms positioned in side-by-side relationship and connected to each other to form a bridge span, each of said bridge platforms comprising a plurality of laminates sandwiched between two side channel members and having an end plate channel members at each of said ends, said side channel members substantially perpendicular to each of said end plate channel member, and wherein said laminates form a substantially planar top surface of each of said bridge platforms, wherein the improvement comprises:

each of said bridge platforms including at least a pair of substantially flat locking plates, each of said locking plates having opposed parallel plate faces with an opening extending through the plate faces, wherein one of said pair of locking plates is affixed to a first corner of said bridge platform and another of said pair of locking plates is affixed to a second corner of said bridge platform along the same side of the bridge platform, wherein said opposed parallel plate faces are substantially parallel to said bridge platform sides;

at least one of said pair of bridge platforms including a plurality of shear plates each of which are integral with one of said two side channel members and spaced apart along the length of said side channel member, each said shear plate having an outer perimeter substantially complementary to a profile of said side channel member and having a shear plate engagement surface for engaging a surface of a side channel member;

coupling means for coupling said pair of bridge platforms together in side-by-side relationship with the locking plates of one bridge platform substantially in alignment with the locking plates of the other of said pair of bridge platforms, including a bolt sized for insertion through the openings of said locking plates and means for securing the bolt to the locking plates, and wherein the outer perimeter of each said shear plate of one bridge platform is received within the side channel member of the adjacent bridge platform so that the shear plate engagement surface engages a surface of said side channel member.

2. The portable bridge system of claim 1 wherein one of said pair of locking plates is affixed to an end plate channel member at one bridge platform end, and the other of said pair of locking plates is affixed to an end plate channel member at the other bridge platform end.

3. The portable bridge system of claim 2 wherein said locking plates are welded to said end plate channel members.

4. The portable bridge system of claim 1 wherein said shear plates are welded to said one of said two side channel members.

5. The portable bridge system of claim 4 wherein said side channel members have a cross-sectional profile of three surfaces including a first surface lying substantially perpendicular to the top surface of the bridge platform, and forming a web between the second and third surfaces, each of which extend outwardly from the first surface, and wherein each said shear plate has an inner perimeter of three surfaces substantially complementary to the cross-sectional profile of said side channel member and is welded to the complementary three surfaces of said side channel member, and wherein each said shear plate has an outer perimeter, the outer perimeter having three surfaces substantially complementary to the side channel member of an adjacent bridge platform.

6. The portable bridge system of claim 5 wherein each surface of the outer perimeter of said shear plate defines a shear plate engagement surface for engaging a respective complementary surface of said side channel member.

7. The portable bridge system of claim 1 wherein said means for securing the bolt to the locking plates include a pair of nut and washers on opposite ends of the bolt and bearing against each locking plate.

8. In a substantially rectangular bridge platform for forming a portable bridge, the bridge platform comprising a plurality of laminates compressively sandwiched between two side channel members and including two end plate channel members at opposite ends of the bridge platform, said side channel members substantially perpendicular to said end plate channel members, and wherein said laminates form a substantially planar bridge platform top surface, wherein the improvement comprises:

at least a pair of substantially flat locking plates, each locking plate having opposed plate faces with an opening extending through the plate faces, each said locking plate affixed to said bridge platform at opposite end corners of the bridge platform with the plate faces lying substantially parallel to said side channel members;

a plurality of substantially planar shear plates each of which are integral with at least one of said two side channel members and spaced along the length of said at least one of said two side channel members, each shear plate having an outer periphery substantially complementary to a cross-sectional periphery of the side channel members and including a peripheral planar surface lying in a plane substantially parallel to a side channel member; and a bolt sized for insertion through the opening of each said locking plate.

9. The bridge platform of claim 8 wherein each of said locking plates is affixed to opposite end plate channel members.

10. The bridge platform of claim 9 wherein said locking plates are welded to said end plate channel members.

11. A portable bridge formed from at least a pair of bridge platforms, each bridge platform as claimed in claim 8, wherein said pair of bridge platforms are positioned in adjacent side-by-side relationship with the locking plate openings of one bridge platform substantially aligned with the locking plate openings of the adjacent bridge platform and said outer periphery of said shear plates keyed within the adjacent side channel member, and wherein the bolt is inserted through the locking plate openings and bolted to the locking plates.

* * * * *